(No Model.)
C. W. KING.
INSOLE.
No. 386,832. Patented July 31, 1888.
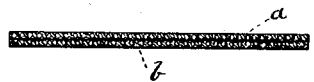
Witnesses.
E. B. Parkhurst
Robert Wallace
Inventor.
Charles W. King
by Wm. A. Macleod
his atty.

UNITED STATES PATENT OFFICE.

CHARLES W. KING, OF WEST NEWTON, MASSACHUSETTS, ASSIGNOR TO CHARLES A. KING, OF NEW YORK, N. Y.

INSOLE.

SPECIFICATION forming part of Letters Patent No. 386,832, dated July 31, 1888.

Application filed September 22, 1887. Serial No. 250,383. (No model.)

*To all whom it may concern:*

Be it known that I, CHARLES W. KING, of West Newton, county of Middlesex, and State of Massachusetts, have invented certain new and useful Improvements in Insoles and Methods of Making the Same, of which the following is a specification, reference being had to the drawings accompanying and forming a part hereof, in which is shown a cross-section of my improved sole as it appears when two layers of material are used in its construction.

The object of my invention is the production of a cheap, flexible, and durable insole; and it consists in an insole constructed of one or more layers of woven fabric treated with shellac, in the manner hereinafter set forth.

My invention will be readily understood from the following description of the method of its manufacture.

In the manufacture of my insole I use, preferably, two layers of canvas or other woven fabric of suitable strength, and I saturate this fabric in a solution consisting of gum-shellac, borax, and water. To make this solution of gum-shellac, the water is heated and the borax put in and dissolved. The gum shellac is then added and the borax-water is kept hot until the gum-shellac is dissolved thereby. Instead of dissolving the gum-shellac in borax-water, it may, however, be dissolved in liquid ammonia, which is an equivalent for the borax-water, in that it is a cheap solvent for the gum-shellac. After the canvas has become saturated, I lay two pieces, as $a\ b$, together, and pass them between heated rolls, such as are employed in a calendering machine. After it leaves the heated rolls, I pass it between cold rolls of a similar kind. This pressing and rolling of the saturated fabric has the effect of filling the pores or interstices thoroughly with shellac and drying the shellac therein, as also drying the shellac between the layers of fabric, causing them to adhere together sufficiently to enable the sole to be cut and handled while it is being secured in the shoe without separating the layers. The fabric being filled with hardened shellac renders it sufficiently impervious to moisture for the purposes of an insole, keeps the edges from raveling or fraying while the sole is being handled, and gives the fabric a color similar to that of leather, which is desirable.

What I claim is—

An insole for boots and shoes, consisting of layers of woven fabric saturated or filled and secured together with gum-shellac dissolved in borax-water or its described equivalent, substantially as set forth.

CHARLES W. KING.

Witnesses:
 WM. A. MACLEOD,
 ROBERT WALLACE.